United States Patent
Ganguly et al.

(10) Patent No.: US 9,521,035 B2
(45) Date of Patent: Dec. 13, 2016

(54) FILTERING NON-ACTIONABLE ALERTS

(71) Applicant: Microsoft Technology Licensing, LLC, Redmond, WA (US)

(72) Inventors: Sandip Ganguly, Redmond, WA (US); Sreenath Kizhakkedath Pudukudi, Redmond, WA (US); Marian Stanescu, Redmond, WA (US); Monica Catunda, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 53 days.

(21) Appl. No.: 14/561,784

(22) Filed: Dec. 5, 2014

(65) Prior Publication Data

US 2016/0163183 A1 Jun. 9, 2016

(51) Int. Cl.
*G08B 23/00* (2006.01)
*H04L 12/24* (2006.01)

(52) U.S. Cl.
CPC .................................. *H04L 41/06* (2013.01)

(58) Field of Classification Search
CPC ............ G06F 17/30707; G06F 11/0781; G06F 11/3072; G06F 12/14; H04L 51/32; H04L 41/0604
USPC ........ 340/501, 517, 521; 709/202, 224, 207, 709/240; 719/318; 726/23
See application file for complete search history.

(56) References Cited

U.S. PATENT DOCUMENTS

| | | | |
|---|---|---|---|
| 7,694,115 B1 | 4/2010 | Porras et al. | |
| 8,098,585 B2 * | 1/2012 | Jiang | G06F 11/0709 370/241 |
| 8,234,641 B2 | 7/2012 | Fitzgerald et al. | |
| 8,423,638 B2 | 4/2013 | Moehler et al. | |
| 8,504,504 B2 | 8/2013 | Liu | |
| 8,751,623 B2 | 6/2014 | Bose et al. | |
| 8,769,096 B2 * | 7/2014 | Carey | H04L 43/04 709/202 |
| 9,009,307 B2 * | 4/2015 | Jain | H04L 41/069 709/223 |
| 9,230,101 B2 * | 1/2016 | Zahran | G06F 21/55 |
| 2014/0095144 A1 * | 4/2014 | Singh | G06F 11/3013 704/2 |

OTHER PUBLICATIONS

Gao, et al., "Improved Semi-supervised Fuzzy Clustering Algorithm and Application in Effective Intrusion Detection System", In International Journal of Advancements in Computing Technology, vol. 5, No. 4, Feb. 2013, 8 pages.

(Continued)

*Primary Examiner* — Toan N Pham
(74) *Attorney, Agent, or Firm* — Henry Gabryjelski; Kate Drakos; Micky Minhas

(57) ABSTRACT

Handling alerts in a system to reduce to the number of non-actionable alerts that are provided to an alert handling portion of the system. A method includes receiving an alert. The alert is an unstructured data alert. The method further includes comparing the alert to a plurality of known non-actionable alerts to determine a similarity of the alert to one or more of the known non-actionable alerts. The method further includes dispatching the alert based on the similarity of the alert to one or more of the known non-actionable alerts.

20 Claims, 2 Drawing Sheets

(56) References Cited

OTHER PUBLICATIONS

"Operational excellence in IT service delivery", Retrieved on: Sep. 26, 2014, Available at: http://researcher.watson.ibm.com/researcher/view_group.php?id=4741.

Tang, et al., "Optimizing System Monitoring Configurations for Non-Actionable Alerts", In Proceedings of IEEE Network Operations and Management Symposium, Apr. 16, 2012, 9 pages.

Tang, et al., "Identifying Missed Monitoring Alerts based on Unstructured Incident Tickets", In Proceedings of the 9th International Conference on Network and Service Management, Oct. 14, 2013, 4 pages.

Mamun, et al., "Efficient Sequential and Parallel Algorithms for Record Linkage", In Journal of the American Medical Informatics Association, Oct. 23, 2013, 12 pages.

Allier, et al., "A Framework to Compare Alert Ranking Algorithms", In Proceedings of IEEE 19th Working Conference on Reverse Engineering, Oct. 15, 2012, 9 pages.

Nguyen, et al., "Improving the management of IDS alerts", In International Journal of Security and Its Applications, vol. 8, No. 3, Oct. 15, 2014, 14 pages.

\* cited by examiner

FILTERING NON-ACTIONABLE ALERTS

BACKGROUND

Background and Relevant Art

Web services running on data centers generate alerts for a gamut of possible issues. These alerts pass through a monitoring system that converts them to tickets surfaced to several hierarchies (e.g. tier 1, tier 2 etc.) of support specialists. As the volume of service calls increases, the time and cost of investigating these alerts increase substantially. An ideal monitoring system has the alerts broken down to several attributes (i.e., the alerts are structured data structured by their attributes) and each ticket is properly labeled as a true (actionable) alert or as a noise (non-actionable) alert. Thus, the alerts are able to be classified by assigned attributes. Under such ideal circumstances it is easy to build a supervised machine learning (classification) model and filter out the noisy alerts, thereby reducing support cost wasted on noisy alerts. Most existing solutions using machine learning to automate ticketing systems depend on decomposing alert descriptions into an attribute-set based on some taxonomy or logic. This is not only computationally intensive (in a real-time environment) but it also does not scale when the taxonomy needs to be manually updated every time a new issue is discovered. In reality, most evolving monitoring systems do not have data in a structured format to build a full-fledged supervised learning model. The alerts having a lack of structured and labelled data however, do not eliminate the need to reduce support cost when the volume of noisy alerts is high.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method for handling alerts in a system to reduce to the number of non-actionable alerts that are provided to an alert handling portion of the system. The method includes receiving an alert. The alert is an unstructured data alert. The method further includes comparing the alert to a plurality of known non-actionable alerts to determine a similarity of the alert to one or more of the known non-actionable alerts. The method further includes dispatching the alert based on the similarity of the alert to one or more of the known non-actionable alerts.

Another embodiment includes a system for handling alerts to reduce to the number of non-actionable alerts that are provided to an alert handling portion of the system. The system includes one or more processors. The system further includes one or more computer-readable media. The one or more computer-readable media includes computer-executable instructions that when executed by at least one of the one or more processors cause the system to receive an alert. The alert is an unstructured data alert. The one or more computer-readable media includes computer-executable instructions that when executed by at least one of the one or more processors cause the system to compare the alert to a plurality of known non-actionable alerts to determine a similarity of the alert to one or more of the known non-actionable alerts. The one or more computer-readable media includes computer-executable instructions that when executed by at least one of the one or more processors cause the system to dispatch the alert based on the similarity of the alert to one or more of the known non-actionable alerts.

Another embodiment includes a system for handling alerts to reduce to the number of non-actionable alerts that are provided to an alert handling portion of the system. The system includes a comparator configured to receive a stream of alerts. The system further includes a data store coupled to the comparator. The data store is configured to store non-actionable alerts. The comparator is configured to compare received alerts to a set of pre-existing non-actionable alerts in the data store to determine how similar these incoming alerts are to the pre-existing non-actionable alerts. The comparator is further configured to dispatch the received alerts based on comparing received alerts to pre-existing non-actionable alerts.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered limiting in scope, embodiments will be described and explained with additional specificity and detail through the use of the accompanying drawings in which.

DETAILED DESCRIPTION

Embodiments of the invention may be applied to unstructured data, as opposed to structured data. Structured data is data that is partitioned into meaningful attributes according to some data model. Thus, for example, structured data may have identified type (e.g. integer or string) attributes, be assigned to a data column, etc. In contrast, unstructured data is simply the raw data without accompanying structure. For example, it may simply be text (although it does not need to be identified as text type data by metadata by a processing system). Embodiments may operate on alerts as unstructured data to identify actionable and non-actionable alerts.

To address distinguishing actionable alerts from non-actionable alerts in in the space of unstructured data, embodiments implement a semi-supervised methodology that uses modified fuzzy matching of textual alert descriptions to determine how similar an alert is to an earlier confirmed noisy alert included in a set of noisy alerts. Alerts that are sufficiently similar to an earlier confirmed noisy alert can be removed from (or not entered into) a queue of alerts to be investigated and/or are linked to their most similar non-actionable alert for a quicker validation by grouping alerts together by similarity, and handling them in batches. This allows for embodiments to exhibit several technical advantages. For example, systems speed can be improved as system resources do not need to be diverted to processing non-actionable alerts. Further system power can be conserved as processing requirements are reduced.

Embodiments can use fuzzy matching to assign a score to an alert based on its proximity to a confirmed non-actionable alert. This may be done by measuring a similarity distance to determine the score. Because this methodology does not depend on structuring of the alert data, it has a low set up cost and low implementation time. Embodiments of the invention can be applied to virtually any alert monitoring system that sends out a series of automated and deterministic text alerts generated by datacenter servers.

Figure 1:
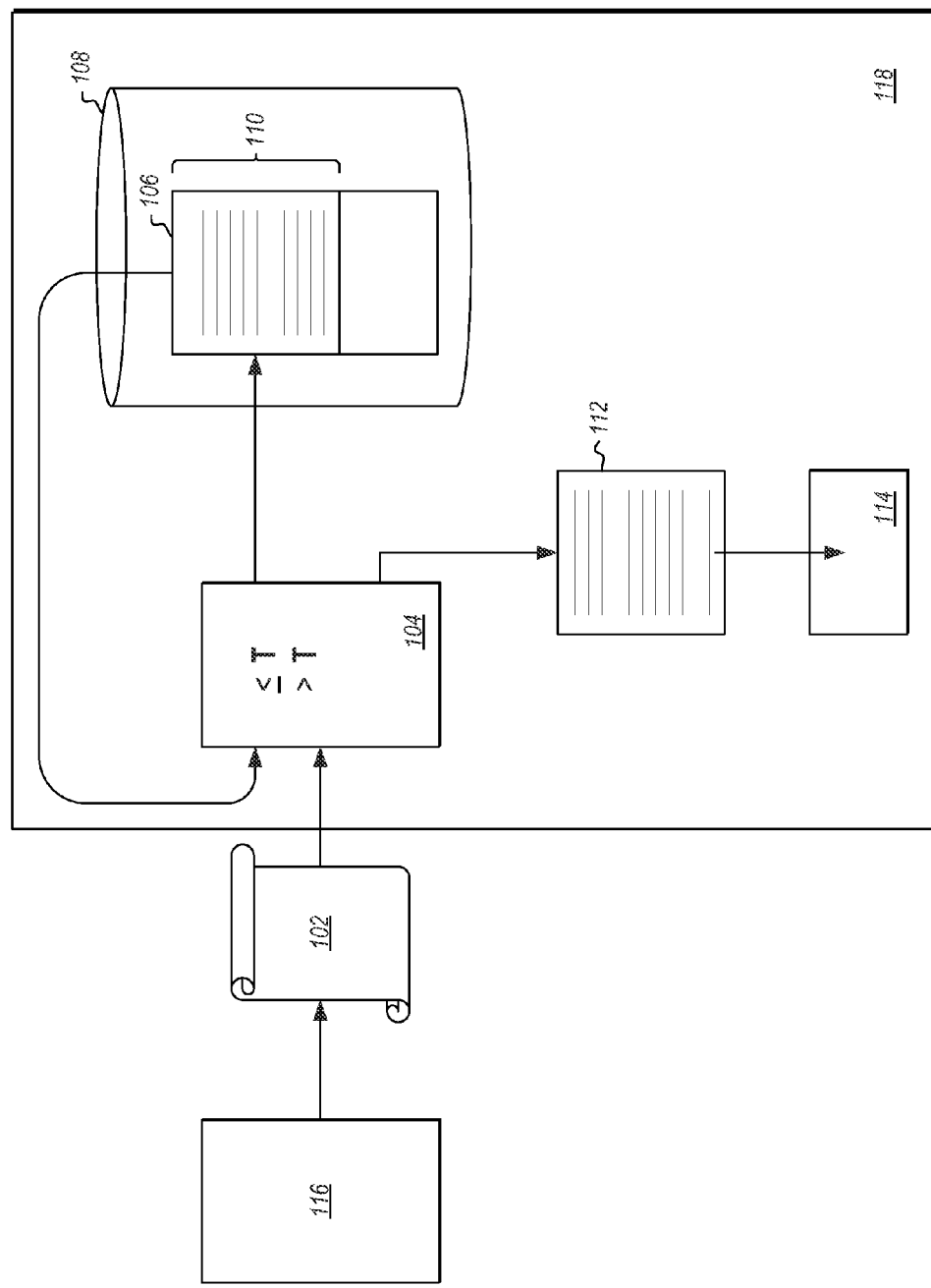
FIG. 1 illustrates an alert handing system configured to filter non-actionable unstructured alerts.

Referring now to FIG. 1, an example is illustrated. FIG. 1 illustrates a text alert 102. The text alert is generated by a data center or other system 116 that, in the illustrated example, generates a series of automated, deterministic, text alerts.

The system 116 may be any one of a number of different systems. For example, the system 116 may be a farm of servers. Alternatively, the system may be a single stand-alone physical machine. Etc.

The text alerts may serve a number of different functions. For example, such alerts may include information on system health. Such alerts may identify errors or processing exceptions. Such alerts may indicate the arrival of other messages, such as email messages. Such alerts may be automated responses to events. Such alerts may be periodic reports. Such alerts may be environmental alerts regarding the environment in which the system 116 is operating. Etc.

The text alert 102 is fed, as input, into a comparator 104. The comparator 104 also receives as input at least a portion of alerts 106 stored in a data store 108 of alerts. The alerts 106 are non-actionable alerts, meaning that these are noisy alerts that have been filtered out of an alert stream and have been identified as alerts for which no action is necessary or for which no action is being taken. Alerts may be added to the alerts 106 by the automated processes described below or may be manually added to the set of alerts 106. Manually adding alerts to the set of alerts 106 may be done to "seed" the automated processes to have alerts for automated comparison or to refine the automated process by adding additional alerts with different characteristics than those already in the set of alerts 106 that can be used by the automated comparison processes.

In the particular example illustrated, the portion of alerts 106 that are provided to the comparator 104 in this example is a limited set of the alerts 106 in the data store 108. In particular, a window 110 of alerts is provided to the comparator 104. For example, in one embodiment, a window of approximately 72 hours may be provided to the comparator 104. Notably, the window may be configurable to optimize the window size. This may be done manually. Alternatively, this may be automatically performed. For example, some embodiments may be able to dynamically adjust the window 110 to optimize error handing. This can be done based on types of errors, frequency of errors, quantity of errors, temporal factors (e.g. time of day, week, month, or year) network connectivity factors, or other factors. Various machine learning or other algorithms may be used to automatically control window size. Thus, the window includes non-actionable alerts in the alerts 106 that have been received in some predetermined time frame. This can be used to limit the number of comparisons that the comparator 104 needs to perform while still focusing on relevant alerts.

The comparator 104 may perform a similarity comparison between a received alert 102 and non-actionable alerts from the window 110. In some embodiments, the similarity comparison of the comparator 104 computes a string distance metric measuring the difference between two sequences. For example, in some embodiments this may be performed by computing the normalized Levingshtein distance between the incoming received alert 102 and each of the non-actionable alerts in the window 110. Note that while the Levingshtein distance is illustrated herein, it should be appreciated that any one (or more) of large number of different string matching algorithms could be alternatively or additionally used.

If the comparator 104 determines that the distance metric for the comparison of the received alert 102 and one or more of the non-actionable alerts and window 110 is less than or equal to a predetermined threshold, then the received alert 102 will be added to the non-actionable alerts 106.

In some embodiments, an added alert is inserted into the window 110 at an adjacent location to the most similar non-actionable alert in the window 110. Thus, the window 110 is not necessarily organized with the alerts in an order of chronologically received; rather, the window 110 may be organized by similarity. Thus, for example, alerts from the alerts 106 with the smallest Levingshtein distance between them will be next to each other in the alerts 106.

If the distance metric for the comparison of the received alert 102 and one or more of the non-actionable alerts in the window 110 is more than the predetermined threshold, then the received alert 102 will be added to a set of actionable alerts 112. These alerts will be elevated to the appropriate support tier to handle the alerts, as represented by the handler 114. In this way, non-actionable alerts can be filtered from actionable alerts to conserve alert handling and processing resources.

Notably, in some embodiments, the alerts in the actionable alerts 112 may also be grouped by similarity, such as by grouping actionable alerts by their Levingshtein distances (or other appropriate measures) from each other (i.e., such that alerts with small Levingshtein distances, or other similarity measures, are near or adjacent to each other in the set of actionable alerts 112). This allows for grouping and batch processing of alerts. For example, a set of actionable alerts that are identical or nearly identical may be handled in the same way. By grouping similar alerts together, all of the similar alerts can be handled by the handler together with minimal or no extra processing.

Further, in some embodiments, by grouping actionable alerts together, some embodiments may be able to implement criteria for prioritized actionable alert handling. For example, if a large number of similar actionable alerts are outstanding, these alerts may be prioritized for handling before other actionable alerts in the set of alerts 112. In an alternative or additional example, if a stream of similar alerts is received that are temporally near each other, i.e. a stream of sufficiently similar alerts received in a predetermined short period of time, this may indicate an urgent acute condition that needs to be addressed quickly. Thus, by identifying similarity between alerts and temporal nearness of alerts, various alert handling decisions can be made.

Notably, it should be appreciated that occasionally an alert that should have been classified as a non-actionable alert will be added to the set of actionable alerts 112 due to their being no similar alert in the set of non-actionable alerts 106. Part of the handling process performed by the handler 114 (including potentially manual handling) on such alerts may include moving non-actionable alerts identified in the set of actionable alerts 112 to the set of non-actionable alerts 106. This will result in future alerts (such as alert 102) being compared to the alert moved from the actionable alerts 112 to the non-actionable alerts 106. Thus, over time, the system can become more efficient at identifying non-actionable alerts as more known non-actionable alerts are manually or otherwise added to the set of non-actionable alerts 106 used for comparison.

Thus, embodiments may implement methods using a distance measurement, such as using a normalized Levingshtein distance, to determine closeness to noise. This can be applied to any scenario that generates text alerts from a system. The methodologies described can be used to reduce tier 1 (or other tier) support costs. The application of the algorithm has a low set up cost and gives a rapid reduction in support costs.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 2:
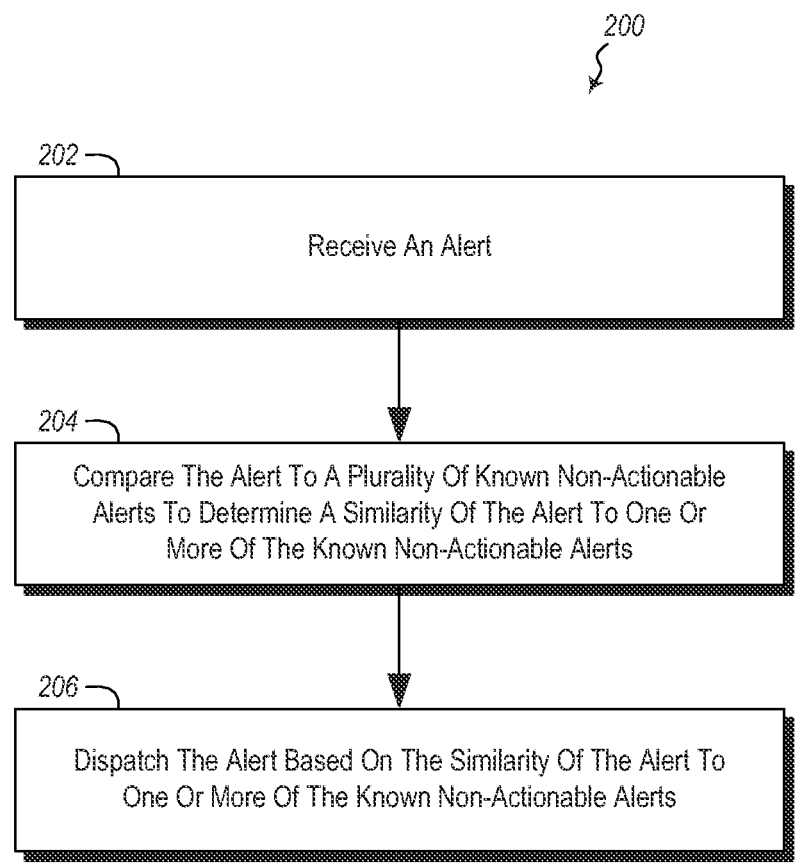
FIG. 2 illustrates a method of handling alerts in a system to reduce to the number of non-actionable alerts that are provided to an alert handling portion of the system.

Referring now to FIG. 2, a method 200 is illustrated. The method 200 includes acts for handling alerts in a system to reduce to the number of non-actionable alerts that are provided to an alert handling portion of the system. The method 200 includes receiving an alert (act 202). The alert is an unstructured data alert that is not classified, meaning that it is not partitioned into meaningful attributes, data columns, etc. Thus, for example, it may simply be plain text. An example is illustrated in FIG. 1 where an alert handling system 118 receives an alert 102.

The method 200 further includes comparing the alert to a plurality of known non-actionable alerts to determine a similarity of the alert to one or more of the known non-actionable alerts (act 204). Thus, for example, as illustrated in FIG. 1, a comparator 104 compares the alert 102 to a plurality of alerts from a set of non-actionable alerts 106.

The method 200 further includes dispatching the alert based on the similarity of the alert to one or more of the known non-actionable alerts (act 206). Various examples of dispatching the alert will be illustrated below.

For example, in some embodiments, dispatching the alert comprises determining that alert meets a threshold of similarity to an alert in the one or more known non-actionable alerts, and as such, adding the alert to the plurality of known non-actionable alerts. Thus, for example, as illustrated in FIG. 1, the comparator 118 is able to compare an alert 102 with other known non-actionable alerts, such as some or all of those in the set of non-actionable alerts 106. If the alert is sufficiently similar to an alert in the set of non-actionable alerts 106, the alert 102 will be added to the set of non-actionable alerts.

Alternatively or additionally, dispatching the alert may include determining that the alert does not meet a threshold of similarity to an alert in the one or more known non-actionable alerts and as a result, using a different means to determine that the alert is a non-actionable alert and as a further result adding to the plurality of known non-actionable alerts. Thus, for example, in FIG. 1, the alerts 102 may not be sufficiently similar to the alerts in the set of non-actionable alerts 106 to be classified as a non-actionable alert and automatically added to the set of non-actionable alerts 106. However, the alert 102 may, nonetheless, be a non-actionable alert. The alert 102 may be added to the set of actionable alerts 112. From there, a user may manually score the alert 102 indicating that the alert 102 is a non-actionable alert. The alert can then be added to the set of non-actionable alerts 106 by a user. The newly added alert added to the set of non-actionable alerts 106 can then be used as a comparison point to automatically classify similar alerts as non-actionable.

Alternatively or additionally, dispatching the alert may include determining that the alert does not meet a threshold of similarity to an alert in the one or more known non-actionable alerts and as a result, providing the alert to an appropriate handler. Thus, for example, as illustrated in FIG. 1, the alert 102 may be compared by the comparator 104, and when the alert 102 is not sufficiently similar to one of the alerts in the set of non-actionable alerts 106 (or some subset thereof, such as the alerts in the window 110), then the alert will be added to the set of actionable alerts 112, where it will eventually be provided to a handler 114 to handle the alert 102.

The method 200 may be practiced where the plurality of known non-actionable alerts is a dynamic set of alerts that roll through a predetermined time window. FIG. 1 illustrates such an example of a window at window 110. The window can be used to ensure alert issues are current issues. Thus in the example above, if an alert has not been added to the window in the past 72 hours, it is removed from the window to keep alerts in the window 110 current. Alerts can be added to the window by automatic and/or manual insertion into the window 110.

The method 200 may be practiced where the alert is received and compared in substantially real time. For example, the alert can be compared with other alerts without needing to classify the alert first to create a structured data alert. Rather the alert can be provided to the alert handling system 118 without first pre-processing the alert.

The method 200 may be practiced where dispatching the alert comprises grouping the alert in a group with sufficiently similar alerts according to predetermined similarity criteria and processing the group of alerts as a batch. Thus, as illustrated above, alerts may be grouped together by similarity, such as by having a small Levingshtein distance between them. In this way, similar alerts can be dispatched or handled together based on their similarity. Additionally, grouping allows more information to be attached to an incoming alert Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include: Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, implemented at a system that includes one or more processors, of handling alerts to reduce a number of non-actionable alerts that are provided to an alert handling portion of the system, the method comprising:
   receiving an alert, wherein the alert is an unstructured alert comprising unstructured data;
   comparing the alert to one or more of a plurality of known non-actionable alerts, to determine a similarity between the alert and at least one of the known non-actionable alerts, including calculating a similarity distance between the unstructured data of the alert and data of the least one known non-actionable alert, the similarity distance indicating how different the unstructured data of the alert is from the data of the least one known non-actionable alert; and
   dispatching the alert based on the calculated similarity distance, including:
     based at least on the similarity distance being less than a predetermined threshold, adding the alert to the plurality of known non-actionable alerts; or
     based at least on the similarity distance being greater than a predetermined threshold, performing additional processing to determine that the alert is a non-actionable alert.

2. The method of claim 1, further comprising adding the alert to the plurality of known non-actionable alerts based on the additional processing.

3. The method of claim 1, wherein performing the additional processing to determine that the alert is a non-actionable alert comprises providing the alert to an appropriate handler.

4. The method of claim 1, wherein the plurality of known non-actionable alerts is a dynamic set of alerts that roll through a predetermined time window.

5. The method of claim 1, wherein the alert is received and compared in substantially real time.

6. The method of claim 1, wherein dispatching the alert comprises grouping the alert in a group with sufficiently similar alerts according to predetermined similarity criteria and processing the group of alerts as a batch.

7. The method of claim 1, wherein calculating the similarity distance between the unstructured data of the alert and data of the least one known non-actionable alert comprises calculating a Levingshtein distance between the unstructured data of the alert and data of the least one known non-actionable alert.

8. A system, comprising:

one or more processors; and one or more computer-readable media, wherein the one or more computer-readable media comprise computer-executable instructions that are executable by at least one of the one or more processors to cause the system to reduce a number of non-actionable alerts that are provided to an alert handling portion of the system, the computer-executable instructions including instructions that are executable to cause the system to:

receive an alert, wherein the alert is an unstructured alert comprising unstructured data;

compare the alert to one or more of a plurality of known non-actionable alerts, to determine a similarity between the alert and at least one of the known non-actionable alerts, including calculating a similarity distance between the unstructured data of the alert and data of the least one known non-actionable alert, the similarity distance indicating how different the unstructured data of the alert is from the data of the least one known non-actionable alert; and dispatch the alert based on the calculated similarity distance, including:

based at least on the similarity distance being less than a prepetermined threshold, adding the alert to the plurality of known non-actionable alerts; or based at least on the similarity distance being greater than a predetermined threshold, performing additional processing to determine that the alert is a non-actionable alert.

9. The system of claim 8, the computer-executable instructions also including instructions that are executable to cause the system to add the alert to the plurality of known non-actionable alerts based on the additional processing.

10. The system of claim 8, wherein performing the additional processing to determine that the alert is a non-actionable alert comprises providing the alert to an appropriate handler.

11. The system of claim 8, wherein the plurality of known non-actionable alerts is a dynamic set of alerts that roll through a predetermined time window.

12. The system of claim 8, wherein the alert is received and compared in substantially real time.

13. The system of claim 8, wherein dispatching the alert comprises grouping the alert in a group with sufficiently similar alerts according to predetermined similarity criteria and processing the group of alerts as a batch.

14. The system of claim 8, wherein calculating the similarity distance between the unstructured data of the alert and data of the least one known non-actionable alert comprises calculating a Levingshtein distance between the unstructured data of the alert and data of the least one known non-actionable alert.

15. A computer program product comprising one or more computer-readable media, wherein the one or more computer-readable media comprise computer-executable instructions that are executable by one or more processors to cause a system to reduce a number of non-actionable alerts that are provided to an alert handling portion of the system, the computer-executable instructions including instructions that are executable to cause the system to:

receive an alert, wherein the alert is an unstructured alert comprising unstructured data;

compare the alert to to one or more of a plurality of known non-actionable alerts, to determine a similarity between the alert and at least one of the known non-actionable alerts, including calculating a similarity distance between the unstructured data of the alert and data of the least one known non-actionable alert, the similarity distance indicating how different the unstructured data of the alert is from the data of the least one known non-actionable alert; and dispatch the alert based on the calculated similarity distance, including:

based at least on the similarity distance being less than a predetermined threshold, adding the alert to the plurality of known non-actionable alerts; or based at least on the similarity distance being greater than a predetermined threshold, performing additional processing to determine that the alert is a non-actionable alert.

16. The computer program product of claim 15, the computer-executable instructions also including instructions that are executable to cause the system add the alert to the plurality of known non-actionable alerts based on the additional processing.

17. The computer program product of claim 15, wherein performing the additional processing to determine that the alert is a non-actionable alert comprises providing the alert to an appropriate handler.

18. The computer program product of claim 15, wherein the plurality of known non-actionable alerts is a dynamic set of alerts that roll through a predetermined time window.

19. The computer program product of claim 15, wherein dispatching the alert comprises grouping the alert in a group with sufficiently similar alerts according to predetermined similarity criteria to allow the group of alerts to be processed as a batch.

20. The computer program product of claim 15, wherein calculating the similarity distance between the unstructured data of the alert and data of the least one known non-actionable alert comprises calculating a Levingshtein distance between the unstructured data of the alert and data of the least one known non-actionable alert.

* * * * *